United States Patent [19]

Hall

[11] Patent Number: 4,683,747

[45] Date of Patent: Aug. 4, 1987

[54] TIMING DEVICE

[76] Inventor: James W. Hall, 9511 Merrick, Taylor, Mich. 48180

[21] Appl. No.: 839,555

[22] Filed: Mar. 14, 1986

[51] Int. Cl.[4] .......... G01M 15/00

[52] U.S. Cl. .......... 73/119 R

[58] Field of Search .......... 73/119 R, 118.1, 116, 73/117.3; 29/48.5 A

[56] References Cited

U.S. PATENT DOCUMENTS

| | | | |
|---|---|---|---|
| 2,602,328 | 7/1952 | Tippett | 73/116 |
| 2,605,636 | 8/1952 | Tippett | 73/116 |
| 3,100,988 | 8/1963 | Mansfield | 73/116 |
| 4,088,011 | 5/1978 | Bodine | 73/116 |
| 4,262,527 | 4/1981 | Grover et al. | 73/116 |
| 4,285,259 | 8/1981 | Jelinek et al. | 29/48.5 A X |
| 4,296,629 | 10/1981 | Vuyovich | 73/116 |
| 4,429,570 | 2/1984 | Tinder | 73/119 A |
| 4,435,128 | 3/1984 | Frey et al. | 417/63 |
| 4,455,865 | 6/1984 | Davenport | 73/116 |

*Primary Examiner*—Jerry W. Myracle
*Attorney, Agent, or Firm*—Joseph J. Goluban

[57] ABSTRACT

An Improved Timing Device used as a tool to reduce the time required to tune an 8.2 liter diesel engine or any similar engine which utilizes the same timing procedure, the timing device preferred embodiment comprises a mounting plate, a housing assembly having a pressure and pilot guide side, and a location pin. The displacement of the location pin may be effectuated by using a pneumatic, electrical, or mechanical power source having a control switch which allows the user to set the location pin of the device into the location point of the vehicle's flywheel from the engine compartment, thus eliminating the necessity of resetting by hand the location pin from underneath the vehicle for each piston of the vehicle's engine. The Improved Timing Device would replace the old style hand positioned location pin or similar devices used for determining the top dead center of each of the vehicle's pistons when setting the valves and injectors to the manufacturer's specification.

26 Claims, 11 Drawing Figures

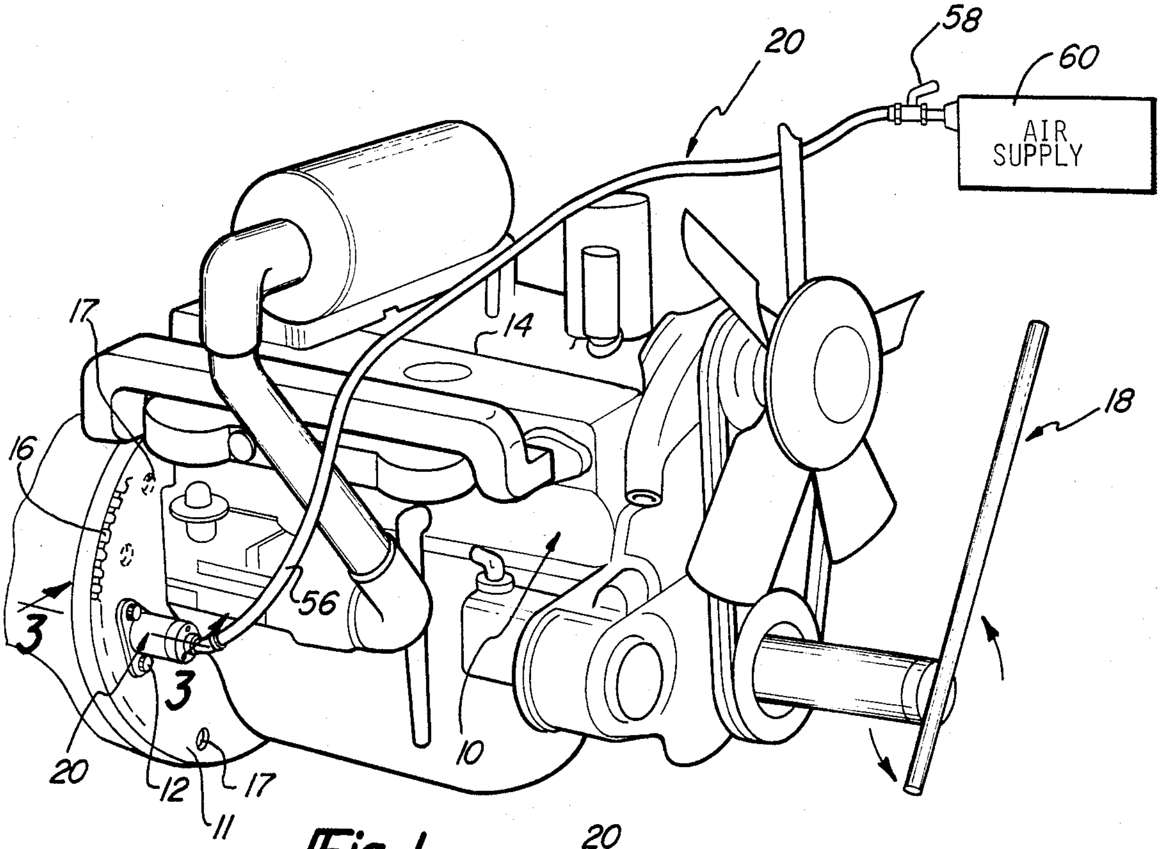
IFig-1
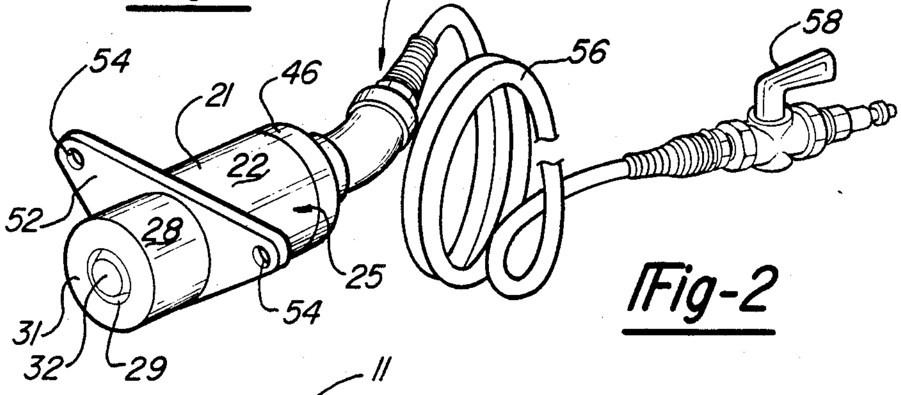
IFig-2
IFig-3
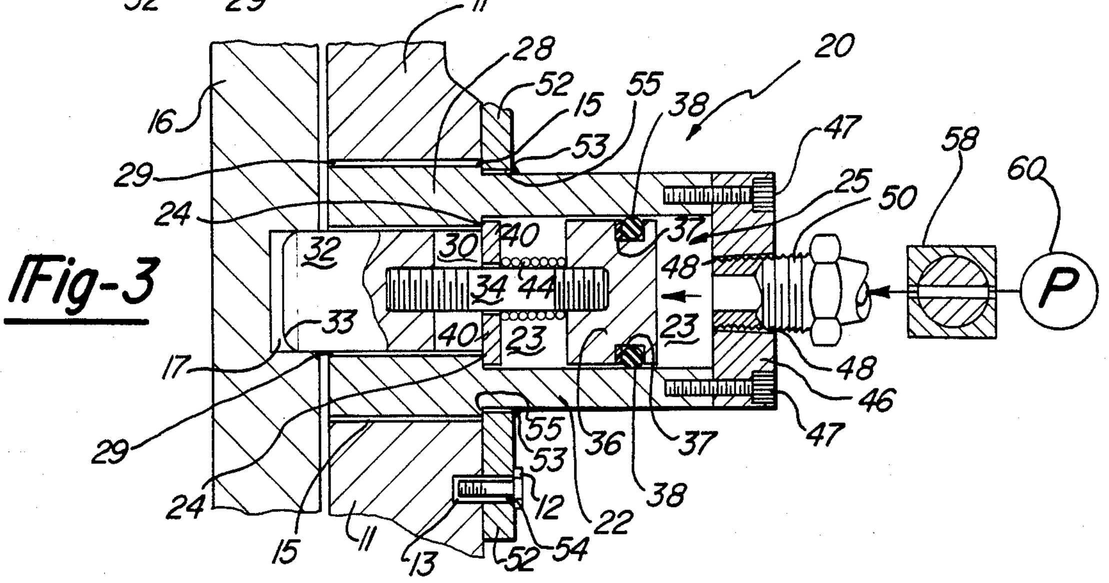

TIMING DEVICE

BACKGROUND OF THE INVENTION

1. Field of the Invention

The present invention relates to an Improved Timing Device used to automatically find the location points on the flywheel of an 8.2 liter diesel engine or any other engine utilizing a similar timing procedure. The invention is designed to aid the user in setting the valves and injectors of an engine to the original specification of the manufacturer by reducing the time required to determine the top dead center for each piston of a vehicle's engine before setting the valves and injectors, by allowing the user to position the location points of the flywheel, so the pistons are at top dead center without leaving the vehicle's compartment. The present invention thus eliminates the necessity of resetting by hand the location pin from underneath the vehicle for each of the vehicle's pistons.

2. Description of the Prior Art

When tuning an 8.2 liter diesel engine or similar engine it is required that the mechanic be able to determine the top dead center position of each of the vehicle's pistons. The conventional techniques for determining the top dead center of an 8.2 liter diesel engine required the use of either two persons or the movement of the one person (mechanic) between the top of the engine compartment and the vehicle's bell housing located underneath the engine compartment.

One such prior art technique using only one person requires the use of a prior art device commonly referred to as a "slug" which is manufactured under the trade name of "Kent Moore" tool, part number J-29139, which applicant shall refer to as a prior art "location pin".

The mechanic would first go underneath the engine of the vehicle and remove the cover plate over the hole opening in the vehicle's bell housing which allows access to the location points on the flywheel. Next, the mechanic would take a breaker bar with one hand and slowly rotate the engine after placing it into the socket located on the engine's damper wheel, while at the same time with the free hand he would feel for the location point recess on the flywheel with his thumb. Once, the location point was positioned over the bell housing opening the mechanic would insert and bolt unto the bell housing the location pin and return to the engine compartment to begin the tuning of the engine by checking and setting the valve and injector for the number one cylinder, utilizing a well known prior art timing tool, such as, a Kent Moore Dial Indicator.

After setting the valves and injector for the number one cylinder the mechanic would leave the engine compartment and go underneath the vehicle to remove the location pin from the bell housing opening and again using both hands (as above described) would slowly rotate the engine with a breaker bar until the flywheel location point for cylinder number three was positioned over the bell housing opening and again would insert into and bolt to the bell housing the location pin and then return to the engine compartment to continue with the tuning of the number three cylinder. The above described procedure is repeated for each cylinder of the vehicle until all cylinders with their valves and injectors have been set to the original manufacturer's specification. Once the tuning for all cylinders in firing order 1, 3, 5, 7, 2, 4, 6 and 8 has been completed the mechanic for the last time would go underneath the vehicle and disconnect the location pin from the bell housing opening and bolt the cover plate back into place.

It can be appreciated that the above described prior art procedure of resetting the location pin by hand for each of the vehicle's cylinders is both time consuming and works the mechanic nearly dead by the physical exhaustive efforts required to move between the engine compartment and the bell housing located underneath the vehicle. The use of my invention requires only two trips underneath the vehicle: first, to bolt on my Improved Timing Device and second, to remove it when the timing of the diesel engine is completed, thus reducing by approximately one hour the normal one and one-half hour time required to tune an 8.2 liter diesel engine.

Another example of a prior art procedure used to pre-set the pistons of an 8.2 liter engine its top dead center is to use an old style Kent Moore Dial Indicator. The mechanic would first remove the valve covers of the engine block and place the Kent Moore device over the vehicle's number one piston and rotate the engine with a breaker bar until said piston's followers descends 20–40 thousand to approximate the top dead center location of the piston. Next, the mechanic would go underneath the vehicle to set the location pin into the flywheel location point and return to the engine compartment to set the valves and injectors to the manufacturer's specification using the Kent Moore device. This prior art procedure is commonly referred to as Base Circle Timing.

Applicant made a time study comparing the use of the Kent Moore Dial Indicator in combination with applicant's invention and found that it took one hour and twenty-five minutes to tune an 8.2 diesel engine using only the Kent Moore device, while it only took twenty-two minutes to tune the same engine using applicant's Improved Timing Device in combination with the Kent Moore device. The large reduction in tuning time for the diesel engine was attributed to the mechanic only having to go underneath the engine twice using applicant's device, since the location pin could be set into the flywheel location points without leaving the engine compartment and without the use of the Kent Moore device to locate the piston's top dead center.

SUMMARY OF THE INVENTION

It is the object of the present invention to provide a new and improved timing device used to time an 8.2 liter diesel engine or any similar engine utilizing the same tuning procedure.

Another object of the present invention is to provide an improved timing device which reduces the time required to tune an 8.2 liter diesel engine or any similar engine utilizing the same tuning procedure.

Another object of the present invention is to provide an improved timing device which reduces the number of times that a mechanic is required to go underneath a vehicle to set the vehicle's pistons at top dead center.

Still another object of the present invention is to provide an improved timing device having different means for positioning the location pin into the location point of an engine's flywheel.

Still another object of the present invention is to provide an improved air powered timing device.

Still another object of the present invention is to provide an improved electrically powered timing device.

Still another object of the present invention is to provide an improved manually operated timing device.

A still further object of the present invention is to provide an improved timing device which is safer to install and operate.

A still further object of the present invention is to provide an improved timing device which is easier to use and economical to manufacture.

Further objects and advantages of this invention will be apparent from the following description and appended claims, reference being made to the accompanying drawings forming a part of this specification, wherein like reference characters designate corresponding parts in the several views.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 1 is a phantom perspective view of an 8.2 liter diesel engine showing the air powered timing device in use for automatically placing said device location pin into the flywheel location point from the top of the vehicle's engine compartment;

FIG. 2 is a perspective view of an air powered timing device;

FIG. 3 is a cross sectional view taken in the direction of the arrows along section line 3—3 of FIG. 1 showing the location pin seated into the flywheel location point;

Figure 4:
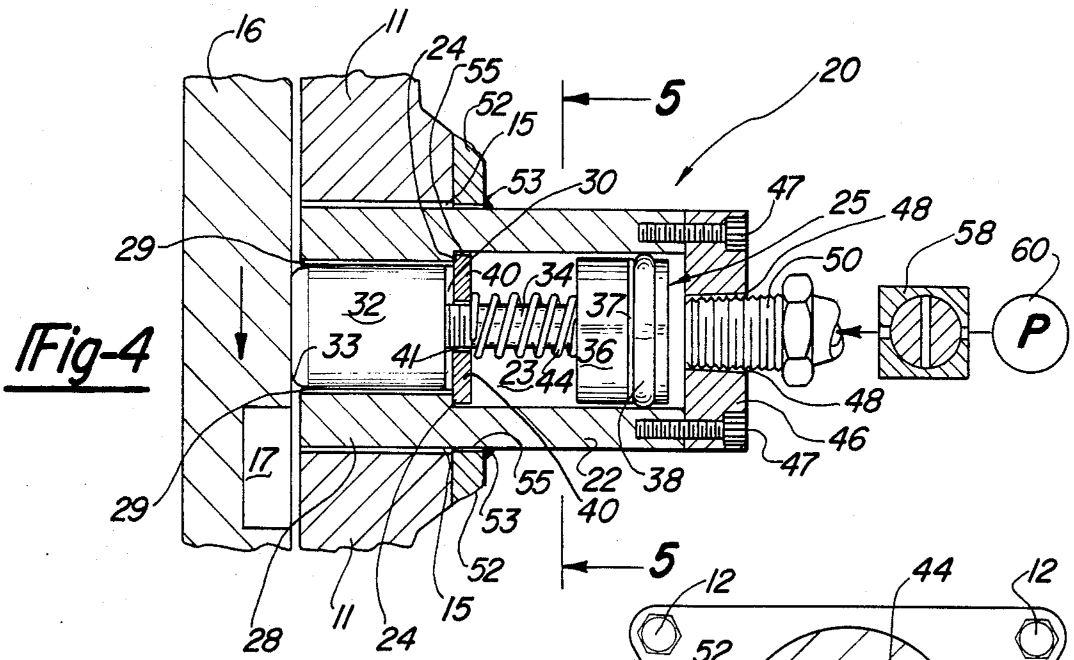
FIG. 4 is a partial cross sectional view of the air powered timing device showing the location pin in a retracted position from the flywheel location point.
Figure 5:
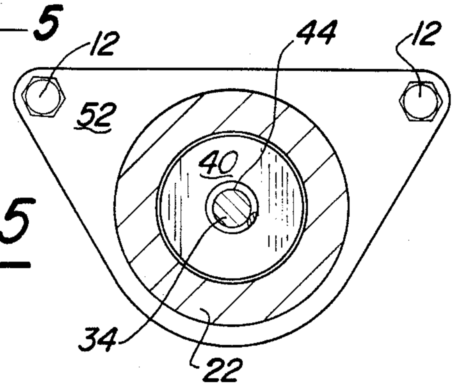
FIG. 5 is a cross sectional view taken in the direction of the arrows along section line 5—5 of FIG. 4 showing the mounting plate and machine bolts used to attach my device to the vehicle's flywheel bell housing.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseolgy and terminology employed herein is for the purpose of description and not of limitation.

DETAILED DESCRIPTION

FIG. 1 depicts an improved air powered timing device, generally designated by reference numeral 20, which I disclose as my preferred embodiment of my invention. The improved air powered timing device 20 is shown in an operative position with respect to an 8.2 liter diesel engine 10 shown in phantom. The air powered timing device 20 is mounted to the bell housing 11 of the vehicle's engine 10 by means of machine bolts 12 which extends through the apertures 54 located in the mounting plate 52 into threaded aperture 13 of bell housing 11.

The air powered timing device 20, as can be best seen in FIGS. 2, 3, 4 and 5 of the drawings, includes a cylindrical housing 21 element which is divided into a pressure housing 22 and a pilot housing guide 28 sections. The pilot housing guide 28 having a cylindrical chamber 30 disposed therein and an end 31 portion. At the end 31 of the pilot housing guide 28 of the device 20 is a location pin 32 disposed within a cylindrical aperture 29 of the pilot housing guide 28 so as to allow the location pin 32 extension from or retraction into said aperture 29.

The location pin 32 being so disposed within the cylindrical chamber 30 to allow its longitudinal displacement therein. Also, the location pin 32 is suitably connected to one end of shaft 34 by any of the many available means known in the prior art, such as: by machine threading, while at the opposite end of shaft 34 a piston 36 is connected in the same manner as the location pin 32. The shaft 34, as can be best seen in FIGS. 3 and 4 of the drawings extends through a flat washer 40 aperture 41 and is so constructed that it can freely move in a longitudinal direction with cylindrical housing 21 between the pilot housing guide 28 and the pressure housing 22 respective chambers.

The pressure housing 22 cylindrical chamber 23 is constructed with a larger diameter than the pilot housing guide 28 cylindrical chamber 30, so as to form a ledge 24 like surface at their juncture upon which flat washer 40 is seated. The pressure housing 22 being on the opposite side of said mounting plate 52 then the pilot housing guide 28 and having a stem 50 disposed on it send cap 46. Located between the flat washer 40 and the nonpressure side of piston 36 is disposed a helical compression spring 44 which extends concentrically about the length of shaft 34 when a noncompressed condition exists. The spring 44 length is so designed that it will securely hold in place flat washer 40 against ledge 24 even when the air supply 60 is turned off, as can be best seen in FIG. 4 of the drawings.

The piston 36 is designed to allow for its longitudinal movement within cylindrical chamber 23 of pressure housing 22 and has a groove 37 disposed about the piston 36 perimeter which can accommodate a sealing-o-ring 38. The sealing-o-ring 38 can be constructed from any of the many known prior art sealing materials, such as, neoprene. The sealing-o-ring 38 will provide an airtight seal between the perimeter of the piston 36 and the inside surface of cylindrical chamber 23.

An end cap 46 is secured to the end of the pressure housing 22 by means of machine screws 47 to provide an airtight seal, except at the air escape notch 25 location. The purpose of the air escape notch 25 is to allow the pressure within the pressure housing 22 cylindrical chamber 23 to return to a normal atmospheric condition as soon as the compressed air supply 60 is turned off, by allowing the escape of the compressed air from the cylindrical chamber 23. Applicant has found that the use of an air escape notch 25 of 0.010 to 0.015 inch in size and having a v-shape allows the compressed air contained within the cylindrical chamber 23 to be immediately bled off when the air supply 60 is turned off, while at the same time it provides for a controlled escape of the compressed air when the air supply 60 is activated due to the drag of the escaping air passing through such a small hole. Thus, insuring a controlled longitudinal displacement of piston 36 in the direction of the the flat washer 40 causing the compression of the helical compression spring 44 when the air supply 60 is activated.

The end cap 46 has an aperture 48 which can cooperatively accept a stem 50 to which any standard type air hose 56 or air valve 58 may be attached.

Attached to the outside perimeter of the cylindrical housing 21 is a mounting plate 52. The mounting plate 52 can be attached by any suitable means well known in the art, such as welding 53, providing it is securely attached to the cylindrical housing 21. A pair of apertures 54 are located at the opposite ends of the mounting palte 52 through which machine bolts 12 are inserted when my device is attached to the vehicle's bell housing 11. The pilot housing guide 28 being disposed through center aperture 55 located near the center of said mounting plate 52 and securing attached thereto as above described.

The air hose 56 should be of sufficient length to traverse the distance between the stem 50 of the air powered timing device 20 and the top 14 of engine 10 when said device is mounted to the vehicle's bell housing 11 by means of a machine bolt 12. Attached to the end of the air hose 56 at the top 14 of said engine 10 is activating means, such as, air valve 58 to which air supply 60 is connected. The air valve 58 can be of any of the many standard type air valves presently being used, provided it can be manually turned on or off by the operator without the necessity of being first disconnected from said air supply 60.

Referring now to FIGS. 3 and 4 of the drawings I now wish to explain in detail how my improved air powered device 20 works. As can be seen in FIG. 4 when the air valve 58 is shut off the air supply 60 cannot enter the pressure housing 22 cylindrical chamber 23, therefore, the compression spring 44 is permitted to extend its full length in a longitudinal direction between the flat washer 40 and the nonpressure side of piston 36. The expansion of spring 44 away from flat washer 40 causes the piston 36, shaft 34 and location pin 32 to be displaced in a longitudinal direction within cylindrical housing 21 towards end cap 46. Notice that the tapered end 33 of location pin 32 is approximately flush with the end 31 of the pilot housing guide 28 when the air supply 60 is shut off.

The helical compression spring 44 will remain in an extended configuration until the air valve 58 is opened, at which time the air supply 60 will cause the movement of pressurized air through the air valve 58, air hose 56 and stem 50 into cylindrical chamber 23. The increased air pressure within chamber 23 causes piston 36, shaft 34 and location pin 32 to be displaced in a longitudinal direction towards the end 31 of pilot housing guide 28. With the air valve 58 in an opened position the helical compression spring 44 will remain compressed, as best seen in FIG. 3 with the location pin 32 protruding out the aperture 29 past the end 31 of the pilot housing guide 28. However, once the air valve 58 is shut off the compressed air contained in pressure housing 22 cylindrical chambers 23 will immediately bleed off through the air escape notch 25. Thus, allowing the helical compression spring 44 to return to its extended configuration causing the displacement of the piston 36, shaft 34 and location pin 32 in a longitudinal direction toward end cap 46. Again, I wish to emphasize the importance of having air escape notch 35 positioned at the end of cylindrical chamber 23 in the pressure housing 22 to provide an avenue for the compressed air to immediately escape. If the air escape notch 25 was not there, it would be necessary to disconnect the air supply 60 to allow the compressed air to escape through the air hose 56 once the valve 58 was opened. Obviously, this would not be an acceptable procedure, since it would increase the time required to tune the engine.

I do now wish to described in detail how best my invention may be employed, utilizing its preferred exemplary embodiment, as can be best seen in FIGS. 1 to 5. The mechanic first goes underneath the vehicle engine 10 and removes the cover plate (not shown) of the bell housing 11 location aperture 15. The removal of the cover plate allows access to the flywheel 16 location points 17 by the mechanic. Next, the mechanic brings the first location point 17 of the flywheel 16 (corresponding to piston one of the engine 10) to its approximate top dead center by rotating said flywheel 16 with a breaker bar 18 and then inserts pilot housing guide 28 portion of the air powered timing device 20 into the location aperture 15 of the bell housing 11. Once the air powered timing device 20 is positioned within the bell housing 11, location aperture 15, it is securely bolted into place by means of machine bolts 12 inserted into apertures 54 of plate 52 by screwing into threaded aperture 13 of the bell housing 11. Once said device is installed the air supply 60 is connected to air valve 58 by means of standard attachment coupling (not shown). The air supply 60 is then turned on by air valve 58 causing the location pin 32 to move forward towards flywheel 16. The mechanic using the breaker bar 18 causes the flywheel 16 to move in the direction of the arrow in FIG. 4 which will eventually cause the alignment of location point 17 of flywheel 16 and the location pin 32. The location pin 32 will then engage and lock into the location point 17 as best seen in FIG. 3. Once the flywheel 16 is locked into place at the location point 17 of the flywheel 16 the mechanic can adjsut the valves and injectors to the manufacturer's specifications using any conventional tuning device, such as a Kent Moore Dial Indicator. After the mechanic has completed all necessary adjustments for the first cylinder, the air valve 58 is shut off causing the retraction of location pin 32 from location point 17. If the location pin 32 should vind to the side of location point 17, simply rotate the engine flywheel 16 back slightly to allow the disengagement of said pin 32 by the retraction force exerted by compression spring 44. Next, slightly rotate flywheel 16 by means of breaker bar 18 in the direction of the arrow as shown in FIG. 4 causing the nonalignment of the flywheel 16, location point 17 with the location pin 32. Then turn on the air valve 58 and repeat the above described steps until engine 10 tune up is completed for all of its cylinders. Once the tune up is completed the mechanic goes underneath the vehicle's engine compartment for the lat time and disengages the air powered timing apparatus 20 and replaces the bell housing 11 cover plate.

Using my improved air powered timing apparatus 20 the mechanic need only go underneath the engine twice, unlike the prior art procedure which requires the mechanic to go under the vehicle as many times as there are cylinders, plus one.

It can be appreciated that the time required to tune an 8.2 diesel engine or any other engine utilizing similar tuning procedure is greatly reduced when my device is used. Also, the personal safety of the mechanic is improved due to the drastic reduction of the number of times he must go underneath the vehicle and the elimination of the use of his fingers to find the location point 17 recess on the flywheel 16. Unlike the prior art devices, my device may be operated by the mechanic while working at the top 14 of the engine compartment.

Figure 7:
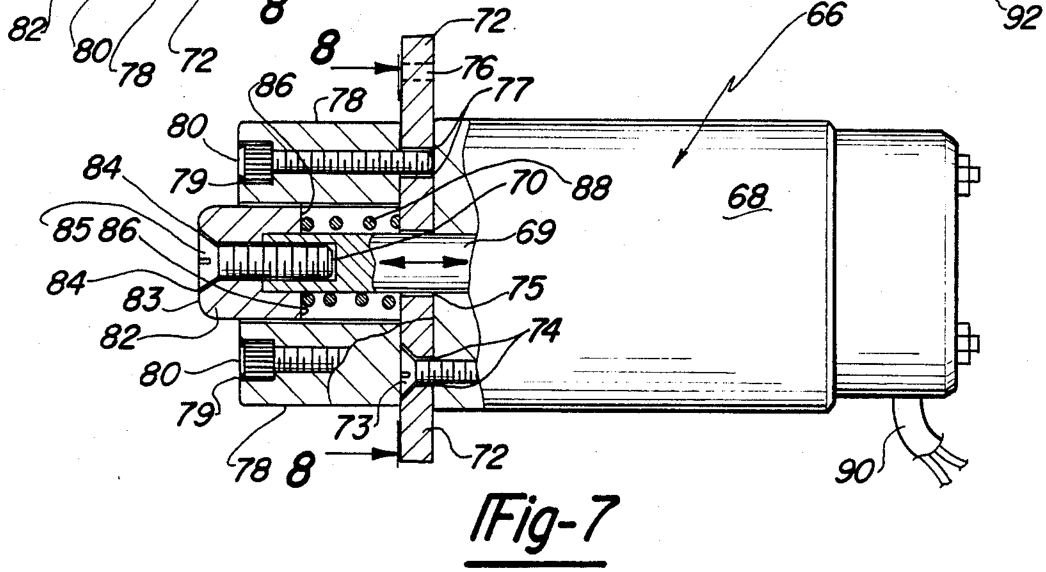
FIG. 7 is a partial cross sectional and side view taken in the direction of the arrows along section line 7—7 of FIG. 6 showing the location pin of the present invention in an extended position.
Figure 8:
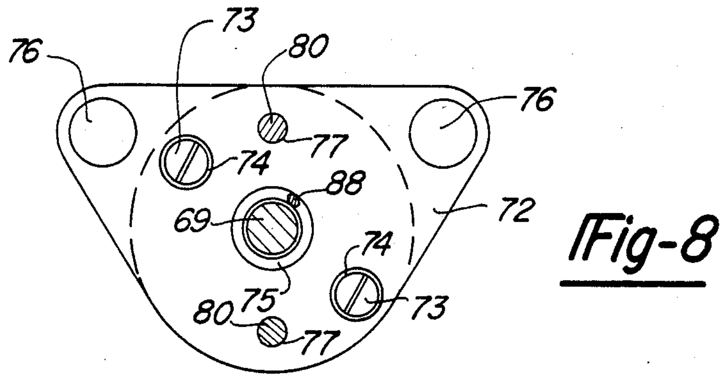
FIG. 8 is a cross sectional view taken in the direction of the arrows along section line 8—8 of FIGS. 6 and 7.

I now wish to disclose two other embodiments of my invention which can be used to automatically set the location pin into the location point of a vehicle's flywheel. First, referring to FIGS. 6, 7 and 8 of the drawings an electrical device emboding the present invention is designated as a whole, by reference numeral 66. The Electric Powered Timing Device 66 has a mounting plate 72 which is attached to the electric solenoid 68 by means of flat head mounting bolts 73 that screw into the electric solenoid 68 threaded aperture (not shown) through countersunk apertures 74 located in mounting plate 72. The mounting plate 72 has a plunger aperture 75 through which the electric plunger shaft 69 may move freely. Located at the opposite sides of said mounting palte 72 are mounting apertures 76 through which machine bolts 12 are inserted to mount my device unto the bell housing 11 of any vehicle.

Over the end of the electrical plunger shaft 69 is disposed a location pin 82 having a tapered end 83. The location pin 82 is so designed as to fit cooperatively over the end of the plunger shaft 69 being effectively held in place by means of flat head screw 85 that is inserted into the countersunk apertures 84 and screwed threaded aperture 70 located at the end of plunger shaft 69.

Between the mounting palte 72 and the inside end 86 of location pin 82 is a helical compression spring 88 which is disposed concentrically about the electric plunger shaft 69. The compression spring 88 is securely held in place between the mounting plate 72 and inside end 86 of location pin 82 once said pin 82 is mounted unto the end of the electric plunger shaft 69. Over the perimeter of location pin 82 is mounted pilot housing guide 78 having an aperture 79 into which assembly bolts 80 are inserted. The assembly bolts 80 are screwed into the bolt apertures 77 thus effectively securing the assembled electric powered timing device 66 together.

The electric solenoid 68 may be of any of the standard type devices used in the field, however, as part of my disclosure I wish to disclose the use of a 12 volt electric solenoid manufactured by Trombetta Corporation of Milwaukee, Wis. under part number 8921218. Attached to the end of the electric solenoid 68 is an electric wire 90 of sufficient length to traverse the distance between the solenoid 68 and the top 14 of engine 10 when said device is mounted to the vehicle's bell housing 11. This will allow the mechanic to operate my device using an electric switch 91 from the vehicle's engine compartment. An electrical wiring 90 is also used to connect the electric switch 91, by suitable means, to a D.C. electrical power source 93. Applicant wishes to disclose the use of alligator clips 92 as such connecting means, as can be best seen in FIG. 6 of the drawings. While I have shown the use of a D.C. electrical power source to operate my Improved Electric Powered Timing device 66 it should be clearly understood that the use of an A.C. electrical powered source would also be possible within the spirit and scope of the present disclosed embodiment.

The electrically powered timing apparatus being similar to my previously disclosed pneumatic embodiment is operated in much the same manner as already disclosed, except for the following differences.

Figure 6:
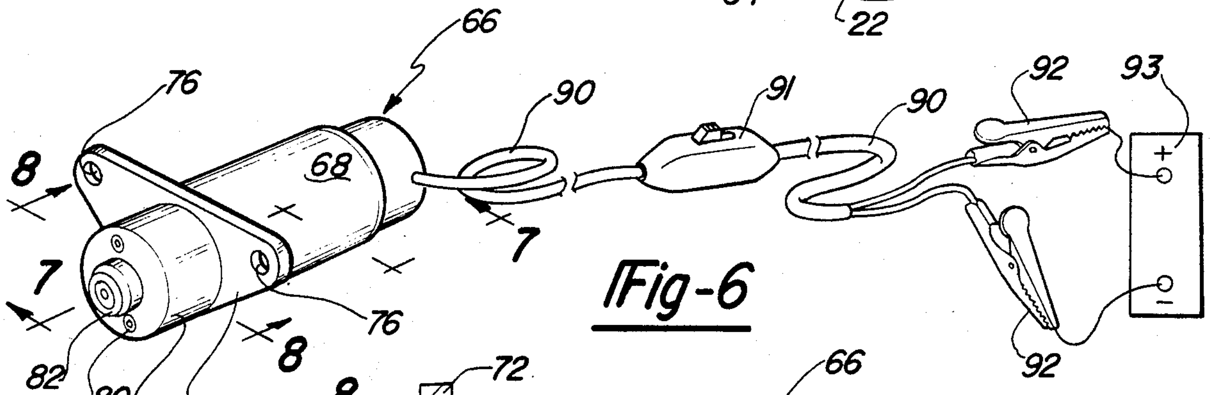
FIG. 6 is a perspective view of an electrically powered timing device.

First, unlike my air powered timing device 20 my electric powered timing device 66 must be connected to either a D.C. or A.C. electrical power source. As shown in FIG. 6 of the drawings I have shown the use of a D.C. electric power source, such as a 12 volt battery. The D.C. electric power source 93 can be easily connected to my device with alligator clips 92, in much the same way as battery jumper cables are used. Second, unlike the air powered timing device 20 embodiment when the D.C. electric power source is not on, the location pin 82 is extended past the end of the pilot housing guide 78 as can be best seen by reference to FIGS. 4 and 7 of the drawings, as a comparison.

The first step after connecting my device to the electric power source and removing cover plate (not shown) off the vehicle's bell housing 11 would be to activate (turn on) the electric power to the electric solenoid 68, by means of an electric switch 91, so as to cause the retraction of the plunger shaft 69 with the attached location pin 82 to move towards the electric solenoid 68 causing the helical compression springs 88 to be compressed (not shown). Unlike the pneumatic embodiment of my invention when the electrical embodiment power source is turned on the helical compression spring 88 is compressed causing the location pin 82 of the electrical embodiment to be retracted, while the location pin 32 of pneumatic embodiment is extended outward when power is on. Recognizing the above described differences a mechanic using my electrical embodiment would always before attempting to insert the pilot housing guide 78 into the vehicle's bell housing 11 location aperture 15, cause the retraction of the location pin 82 by activating the electric power source. Once the location pin 82 is in a retracted position the electric powered timing device 66 is connected to the vehicle's bell housing 11 by means of machine bolts 12 which are inserted into the mounting apertures 76 located in mounting plate 72 and screwed into threaded aperture 13 of bell housing 11.

The balance of the procedure for using my electrical embodiment is similar to that already described, except that since the location pin 82 is in an extended position when the electrical power source is off due to the compression spring 88 being able to urge said pin to its extended position, it is necessary that the electric power source remain off while the mechanic is working on the pistons, valves and injectors of the engine. After the adjustments to the first cylinder is completed the electric power is turned back on, causing the retraction of the location pin 82 from the flywheel 16, location point 17 releasing the engine so that it can be rotated. Next the flywheel 16 is rotated slightly using the above already described procedure and the power source of my electrical embodiment is again shut off allowing the displacement of the location pin 82 towards the flywheel. Once the next location point 17 of the flywheel 16 comes into alignment with the location pin 82, it will be securely seated therein, due to the urging of the compression spring 88. Thus, it can be appreciated that the mechanic is free to continue the tuning of the engine, since the top dead center of the next piston has been accurately located.

Figure 9:
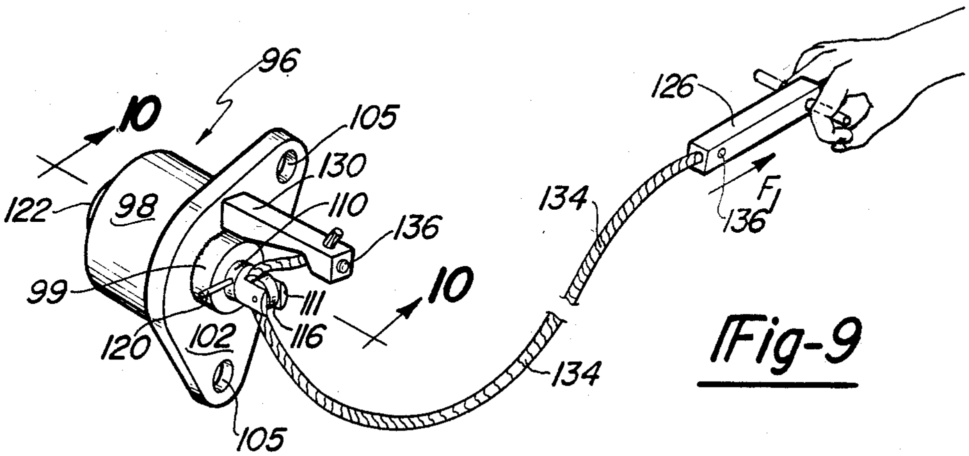
FIG. 9 is a perspective view of a manually operated timing device.
Figure 10:
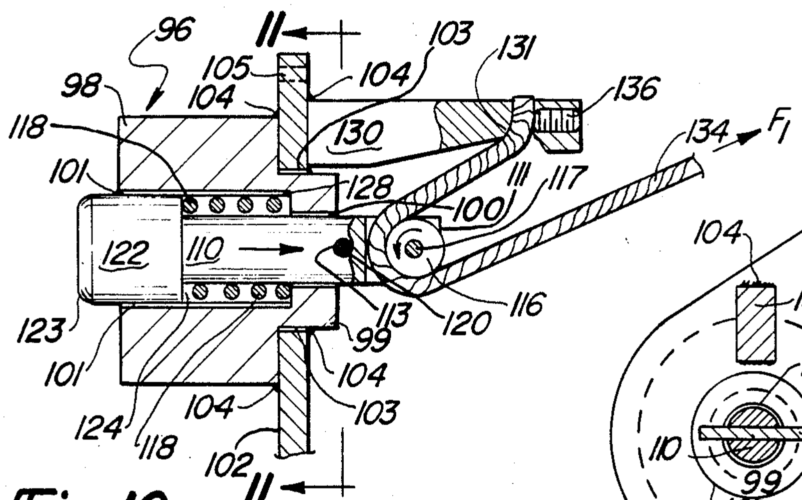
FIG. 10 is a partial fragmentary cross sectional view taken in the direction of the arrows along section line 10—10 of FIG. 9.
Figure 11:
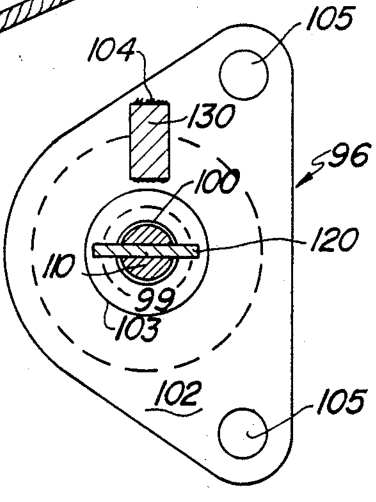
FIG. 11 is a cross sectional view taken in the direction of the arrows along section line 11—11 of FIG. 10.

The last embodiment of my invention can be best seen by reference to FIGS. 9, 10, and 11 of the drawings which I have designated as my manually operated timing device 96. The manually operated timing device 96 has a pilot housing guide 98 having stem 99 section which is cooperatively urged into the plate aperture 103 located in mounting plate 102 and held permanently in place by any of the well known prior art means, such as welding 104.

A shaft 110 extends through a shaft aperture 100 located at the stem 99 section of the pilot housing guide 98. The shaft 110 has a fork end 111 which has a roller 116 operatively mounted between said fork end 111 being held in place by means of pin 117 which is inserted into fork aperture 112. A split pin 120 is inserted into a pin aperture 113 disposed in shaft 110. Once the split pin 120 is inserted into the pin aperture 113 the shaft 110 cannot be removed from stem 99 section of the pilot housing guide 98 in a direction opposite that shown by the arrow on said shaft. The opposite end of shaft 110 has been so designed as to cooperatively accept a location pin 122 which is effectively held in place be means of a flat head screw (not shown) similar to that used for the above described electrical embodiment. The location pin 122 has a tapered end 123 and is so constructed that it can be cooperatively inserted into the pin aperture 101, so as to allow its free movement into and out of said aperture 101. Disposed between the inside end 124 of location pin 122 and the end 128 of pin aperture 101 is a helical compression spring 118 being concentrically located about shaft 110. The helical compression spring 118 is securely held in place between the end 128 of pin aperture 101 and the inside end 124 of location pin 122, once said pin 122 is mounted unto shaft 110 as above described. Located on the opposite side of mounting plate 102 is stationary cable anchor 130 which is welded 104 to said plate 102. A cable 134 is inserted into the cable aperture 131 and held in place by means set screw 136. The cable 134 should be of sufficient length so as to allow it to traverse the distance between top 14 of engine 10 when the device is mounted to the vehicle's bell housing 11 by bolts (not shown) which are inserted into bolt apertures 105 of mounting plate 102.

At the opposite end of the cable 134 is attached a tee handle 126 by any suitable means, such as a set screw 136. The cable 134 is positioned about roller 116 as shown in FIG. 10 of the drawings. Once a force F1 is applied in the direction of the arrow, by the operator as shown in FIG. 9, it will cause the movement of the cable 134 towards the operator and the rotation of roller 116 and the displacement of shaft 110 in the direction of the arrows.

Once againthe above described procedure for installation and operation of the pneumatic and electrical embodiments of my invention would also be applicable to my manually operated timing device 96. As in the case of the electrical embodiment of my invention the helical compression spring 118 is only compressed when a force (manual) is applied to the shaft 110 via cable 134 in this embodiment, thus causing the retraction of the location pin 122 into pin aperture 101 of the pilot housing guide 98.

It can be appreciated from the above disclosure and reference to the drawings of my device that the use of my manually operated timing device 96 provides a viable alternative for solving a long term prior art problem relating to the tuning of an 8.2 liter diesel engine when neither pneumatic or electrical power is available.

Further, it will also be appreciated that numerous changes and modifications can be made to the three embodiments disclosed herein, without departing from the spirit and scope of the present invention. Thus, by abandoning the previous construction of a prior art location pin the problems associated with its use has been successfully eliminated.

I claim:

1. A timing device, for positioning a location pin into the location point on the flywheel of an engine, which comprises:

a pilot housing guide, said pilot housing guide having a cylindrical chamber disposed therein and an end portion;

a mounting plate, said mounting plate having an aperture located near it scenter through which said pilot housing guide is disposed and securing attached, said mounting palte also having a pair of apertures positioned at its opposite ends for receiving machine bolts which are screwed into the engine's block;

a location pin, said location pin being so disposed within the cylindrical chamber of said pilot housing guide so as to allow said location pin longitudinal displacement within the cylindrical chamber, the inside end of said location pin being nearer to said mounting plate then the end portion of said pilot housing guide;

means for longitudinally displacing said location pin within the cylindrical chamber of said pilot housing guide; and means for turning on or off said longitudinal displacing means from the engine compartment.

2. A timing device, as defined in claim 1, further comprising:

a pressure housing, said pressure housing having a cylindrical chamber of a larger diameter than said pilot housing guide cylindrical chamber so as to form a ledge like surface at their juncture, said pressure housing being attached to the opposite side of said mounting plate than said pilot housing guide and having a stem disposed at its outside end;

a piston, said piston being so disposed within the cylindrical chamber of said pressure housing so as to allow its longitudinal displacement therein and having a groove disposed about its perimeter so as to accommodate a sealing-o-ring which provides an air tight seal between said piston and the cylindrical chamber of said pressure housing;

a shaft, said shaft being connected at one end to said location pin and at the other end to said piston, said shaft extending through an aperture of the flat washer disposed at the ledge like surface of said pressure housing; and a spring concentrically positioned about said shaft, said spring being disposed between the flat washer and said piston so as to securely hold in place the flat washer against the pressure housing ledge.

3. A timing device, as defined in claim 2, wherein:

said pressure housing has an air escape notch disposed at its end to allow for the controlled escape of the air contained within the cylindrical chamber of said pressure housing as said spring urges the displacement of said piston towards the air escape notch.

4. A timing device, as defined in claim 3, wherein: said means for longitudinally displacing said location pin comprises a pressurized air supply which causes said piston, shaft, and location pin to be displaced in a longitudinal direction towards the end of said pilot housing guide, the pressurized air supply being connected to the stem disposed at the end of said pressure housing by means of an air hose.

5. A timing device, as defined in claim 4, wherein: the air escape notch of said pressure housing is a v-shape notch of 0.010 to 0.015 inch in size.

6. A timing device, as defined in claim 5, wherein: said means for turning on or off said longitudinal displacing means consists of an air valve.

7. A timing device, as defined in claim 2, further comprising:

an air escape notch, said air escape notch being disposed at the end of said pressure hosing to allow for the controlled escape of the air within the cylindrical chamber of said pressure housing, as said spring urges the longitudinal displacement of said piston towards the end of said pressure housing cylindrical chamber.

8. A timing device, as defined in claim 7, wherein: said means for longitudinally displacing said location pin comprises a pressurized air supply which causes said piston, shaft and location pin to be displaced in a longitudinal direction towards the end of said pilot housing guide, the pressurized air supply being connected to the stem disposed at the end of said pressure housing by means of an air hose.

9. A timing device, as defined in claim 8, wherein: said air escape notch is 0.010 to 0.015 inch in size and having a v-shape.

10. A timing device, as defined in claim 9 wherein: said means for turning on or off said longitudinal displcing means consists of an air valve.

11. A timing device, as defined in claim 1, further comprising:

a plunger shaft, said plunger shaft being disposed through the center aperture of said mounting plate being connected at one end to said location pin and at the other end to said means for longitudinally displacing said location pin; and a spring concentrically positioned about said shaft, said spring being disposed between the inside end of said location pin and said mounting plate.

12. A timing device, as defined in claim 11, wherein said means for longitudinally displacing said location pin comprises an electrical solenoid which causes the retraction of said plunger shaft when activated, said electrical solenoid being attached to said mounting plate by means of flat head mounting bolts and electrically connect to either an a.c. or d.c. electrical power supply.

13. A timing device, as defined in claim 12, wherein: said means for turning on or off said longitudinal displacing means comprising an electrical switch disposed between said electrical solenoid and the electrical power supply.

14. A timing device, as defined in claim 13, wherein: said pilot housing guide having a stem section which is placed into and through the aperture located in the center of said mounting plate and permanently attached thereto, and having disposed within the stem section a shaft aperture.

15. A timing device, as defined in claim 1, further comprising:

a shaft, said shaft being disposed through the shaft housing guide, being connected at one end to said location pin while the other end of said shaft has a forked end which has a roller operatively mounted between the fork end and held in place by means of a pin;

a spring concentrically positioned about said shaft, said spring being disposed between the inside end of said location pin and the end of the pin aperture ajacent to the shaft aperture of the stem section of said pilot housing guide; and a cable anchor, said cable anchor being attached to said mounting plate on the opposite side of said pilot housing guide.

16. A timing device as defined in claim 15, wherein: said means for longitudinally displacing said location pin consisting of a manula force applied to the end of a cable which causes the retraction of said shaft and the location pin towards said mounting plate, the cable being attached to said cable anchor by means of a set screw and being of sufficient length to extend around the roller at the fork end of said shaft p to the top of the engine compartment.

17. A timing device used to tune an 8.2 liter diesel engine, comprising:

a pilot housing guide, said pilot housing guide having a cylindrical chamber disposed therin;

a mounting palte, said mounting plate having an aperture located near its center through which said pilot housing guide is disposed and securing attached, said mounting palte also having a pair of apertures positioned at its opposite ends of receiving machine bolts which are screwed into the diesel's engine block;

a location pin, said location pin being so disposed within the cylindrical chamber of said pilot housing guide so as to allow said location pinlongituidinal displacement within the cylindrical chamber; and means for longituidnallydisplacing said location pin within the the cylindrical chamber of said pilot housing guide;

whereby said location pin may be automatically position into the location point of an 8.2 liter diesel engine's flywheel.

18. A method of tuning an 8.2 liter diesel engine, or any other engine utilizing a similar timing procedure with an Improved Timing Device, which comprises the steps of:

attaching an improved timing device to the bell housing of an engine;

rotating the flywheel of the engine to a predetermined position;

connecting the power means to activate the improved timing device, turning on the power means to allow the location pin of the improved timing device to be positioned within the flywheel location point;

tuning the engine's first cylinder to the manufacturer's specification;

shutting off the power means of the improved timing device;

repeating the above steps beginning with the rotation of the flywheel of the engine until all the cylinders are tuned to the manufacturer's specification; and removing the improved timing device from engine's bell housing.

19. The method according to claim 18, including the additional steps of:

removing the cover plate off the engine's bell housing before attaching the improved timing device; and replacing the cover plate on the engine's bell housing when the tune up of the engine is completed.

20. A method as recited in claim 19, wherein the attaching step comprises:

inserting the pilot housing guide of the improved timing device into the bell housing location aperture; and bolting said improved timing device to the engine's bell housing;

21. A method as recited in claim 20, wherein the rotating step comprises:

rotating the flywheel of the engine with a breaker bar before inserting the pilot housing guide to position the engine's number one piston near its top-dead-center;

rotating the flywheel of the engine with a breaker bar after the power means is turned on until the location pin of the improved timing device engages the location point of the flywheel; and rotating slightly the flywheel of the engine with a breaker bar, after shutting off the power means, enough to cause non-alignment of the location pin of the improved timing device with the location point of the flywheel.

22. A method as recited in claim 18, wherein the attaching step comprises:

inserting the pilot housing guide of the improved timing device into the bell housing location aperture; and bolting said improved timing device to the engine's bell housing.

23. A method as recited in claim 22, wherein the rotating step comprises:

rotating the flywheel of the engine with a breaker bar before inserting the pilot housing guide to position the engine's number one piston near its top-dead-center;

rotating the flywheel of the engine with a breaker bar after the power means is turned on until the location pin of the improved timing device engages the location point of the flywheel; and rotating slightly the flywheel of the engine with a breaker bar, after shutting off the power means, enough to cause non-alignment of the location pin of the improved timing device with the location point of the flywheel.

24. A method of tuning an 8.2 liter diesel engine, or any other engine utilizing a similar timing procedure with an Air Powered Timing Device, which comprises the steps of:

removing the cover plate off the location aperture of the engine's bell housing;

rotating the flywheel of the engine with a breaker bar to position the engine's number one piston near its top-dead-center;l inserting the pilot housing guide of the timing device into the engine's bell housing location aperture;

bolting the air powered timing device to the engine's bell housing;

connecting the air supply source to the timing device air control valve;

turning on the air control valve;

rotating the flywheel of the engine with a breaker bar until the location pin of the timing device engages the location point of the flywheel;

tuning the engine's number one cylinder to the manufacturer's specification;

shutting off the air control valve;

rotating slightly the flywheel of the engine with a breaker bar enough to cause the non-alignment of the location pin of the timing device with the location point of the flywheel;

turning on the air control valve and repeating the above described steps of tuning, shutting off and rotating until all the cylinders have been tuned to the manufacturer's specification;

shutting off the air control valve;

removing the air powered timing device from the engine's bell housing; and replacing the cover plate over the location aperture of the engine's bell housing.

25. A method of tuning an 8.2 liter diesel engine, or any other engine utilizing a similar timing procedure with an Electric Powered Timing Device, which comprises the steps of:

removing the cover plate off the location aperture of the engine's bell housing;

connecting the electric powered timing device to its electrical power source with an alligator clip;

turning on the timing device with an electric switch;

rotating the flywheel of the engine with a breaker bar to position the engine's number one piston near its top-dead-center;

inserting the pilot housing guide of the timing device into the engine's bell housing location aperture;

bolting the pilot housing guide of the timing device unto the engine's bell housing;

turning off the electrical power source of the electric powered timing device with an electric switch;

rotating the flywheel of the engine with a breaker bar until the location pin of the timing device engages the location point of the flywheel;

tuning the engine's number one cylinder to the manufacturer's specification;

turning on the elctrical power source of the timing device with an electric switch;

rotating slightly the flywheel of the engine with a breaker bar enough to cause the non-alignment of the location pin of the timing device with the location point of the flywheel;

turning off the electrical power source of the timing device with an electric switch and repeating the above described steps of tuning, turning on, and rotating until all the cylinders have been tuned to the manufacturer's specification;

turning on the timing device with an electric switch;

removing the timing device from the engine's bell housing; and repalcing the cover plate over the location aperture of the engine's bell housing.

26. A method of tuning an 8.2 liter diesel engine or any other engine utilzing a similar timing procedure with a Manually Operated Timing Device, which comprises the steps of:

removing the cover plate off the location aperture of the engine's bell housing;

rotating the flywheel of the engine with a breaker bar to position the engine's number one piston near its top-dead-center;

inserting the pilot housing guide of the timing device into the engine's bell housing location aperture;

bolting the timing device to the engine's bell housing;

rotating the flywheel of the engine with a breaker bar until the location pin of the manually operated timing device engages the location pin of the flywheel;

tuning the engine's number one cylinder to the manufacturer's specification;

applying a manual force to the tee handle of the timing device causing the movement of the cable towards the operator and the displacement of the shaft and location pin away from the flywheel of the engine;

rotating slightly the flywheel of the engine with a breaker bar enough to cause the non-alignment of the location pin of the timing device with the location point of the flywheel;

releasing the manual force applied to the tee handle of said device;

rotating the flywheel of the engine with a breaker bar until the location pin of the timing device engages the location pin of the flywheel and repeating the above described steps of tuning, applying a manual force, rotating, and releasing until all the cylinders have been tuned to the manufacturer's specification;

removing the timing device from the engine bell housing; and replacing the cover plate over the location aperture of the engine's bell housing.

* * * * *